United States Patent

[11] 3,577,717

[72] Inventor Peter J. W. Van Den Munckhof
   Meterikseweg 79, Horst, Netherlands
[21] Appl. No. 776,211
[22] Filed Nov. 15, 1968
[45] Patented May 4, 1971
[32] Priority Nov. 16, 1967
[33] Netherlands
[31] 6,715,578

[54] CUTTING BLADE FOR ROTARY MOWER
   2 Claims, 4 Drawing Figs.
[52] U.S. Cl...................................................... 56/295
[51] Int. Cl...................................................... A01d 55/18
[50] Field of Search........................................... 56/25.4, 295

[56] References Cited
UNITED STATES PATENTS

| | | | |
|---|---|---|---|
| 1,248,330 | 11/1917 | Huish et al..................... | 56/295 |
| 2,427,265 | 9/1947 | Dreischerf..................... | 56/295X |
| 2,475,716 | 7/1949 | Nabors......................... | 56/295X |
| 2,618,919 | 11/1952 | Hutchens...................... | 56/295 |
| 3,103,094 | 9/1963 | Cook............................. | 56/295 |
| 3,176,455 | 4/1965 | Buchanan...................... | 56/295 |

Primary Examiner—Antonio F. Guida
Attorney—Imirie, Smiley, Snyder & Butrum

ABSTRACT: The invention relates to a toothed cutting blade manufactured of thin sheet steel material for a rotary mower and forming at least a portion of a flat ring, its teeth each having an active cutting edge receding from the point of the tooth in respect of the radius going through the said point and an inactive edge being about square to the said radius.

PATENTED MAY 4 1971 3,577,717

INVENTOR

PETER J. W. VAN DEN MUNCKHOF

BY *Emilie & Smiley*

ATTORNEYS

CUTTING BLADE FOR ROTARY MOWER

The invention relates to a cutting blade of thin sheet steel material for a rotary mower and forming at least a portion of a flat ring and comprising circumferentially extending teeth.

In known rotary mowers having at least one rotatable driven disc the said discs are generally provided with circumferential ground teeth. During use of rotary mowers of this type the teeth become blunt and have to be reground.

In order to overcome the resulting drawbacks I have invented a rotary mower comprising at least one mowing disc wherein the disc is fitted with one or more cutting members of thin sheet steel, the cutting members each being shaped as a ring having several circumferentially extending isosceles or equilateral teeth or as a portion of such a ring as described in my copending U.S. Pat. application Ser. No. 622,505 filed Mar. 13, 1967, now abandoned. The said ring-shaped cutting members having a thickness, generally from 0.2 to 1.5 mm. so as to prevent the necessity of grinding and regrinding the teeth. After being worn or damaged, e.g. by stones or similar obstacles, the cutting member may simply be replaced by new ones as the cost of manufacture is rather low.

I have now discovered that the effective life of cutting blades of this kind may be prolonged by the proper choice of the shape of the teeth on said cutting blades.

According to this invention the active cutting edge of each tooth recedes from its point, seen in the direction of rotation, in respect of the radius going through the said point and the center of the ring while the inactive edge of each tooth, at least near to its point, is about square to the said radius.

Preferably the inactive edge of each tooth is described by an arc through the point of said tooth, the arc being concentric with the ring. In a yet preferred embodiment each tooth is unitary with a symmetrical one so as to form a common projection on the ring portion. This feature opens the possibility of simple manufacturing processes. In addition the cutting blades may be reversed after being worn so as to put the unused cutting edges into action.

In a very preferred embodiment of the invented cutting blade the cutting edge of each tooth describes an arc in the plane of the blade to allow of a yet simpler manufacturing process.

The invention will be further described with reference to the accompanying drawing wherein.

Figure 1:
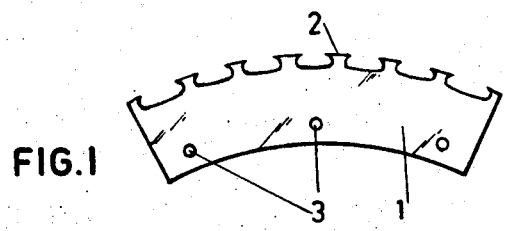
FIG. 1 is a plan view of a cutting blade embodying the invention.

Referring now to FIG. 1 a cutting blade 1 is shown in plan view. It consists of a portion of a flat ring of thin sheet steel material having a thickness from about 0.2 to 1.5 mm. The outer circumference of the ring portion is provided with cutting teeth 2. Ring portion 1 also includes at least two openings 3 near to the inner circumference for purpose of fastening the blade 1 to the mowing disc of the rotary mower.

Figure 2:
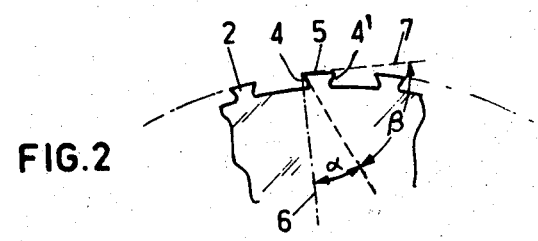
FIG. 2 is a enlarged fragmentary view illustrating one form of cutting blade comprising teeth with straight cutting edges.

A fragmentary enlarged view of a cutting blade 1 is shown in FIG. 2. Its teeth each include a cutting edge 4 receding from the point of the respective tooth, seen in the direction of rotation of the blade (e.g. in the drawing from the right to the left), in respect of the radius 6 going through the said point and the center of the ring, indicated with the angle $\alpha$ in the FIGS. The inactive edge 5 of each tooth, at least near to its point, is about square to the said radius 6. The angle $\beta$ between the inactive edge and the cutting edge 4 of the tooth or the case being between the tangent 7 to the curved edge going through the tooth point and the cutting edge 4 of the tooth therefore is as large as possible if it approximates to the complement of the angle $\alpha$. Cutting blades having such kind of teeth proved to have a longer life.

In the embodiment as shown in this FIG. each tooth is unitary with a symmetrical one so as to form one common projection on the outer circumference of the ring portion with the resulting advantage that the ring or ring portions for the greater part are described by arcs and circles which simplifies the manufacture of the cutting blades. In addition the cutting blade may be reversed after the cutting edge 4 has become blunt so as to use the cutting edge 4'.

Figure 3:
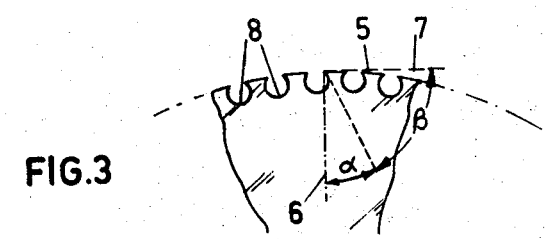
FIG. 3 is an alternate form of blade having arched cutting edges.
Figure 4:
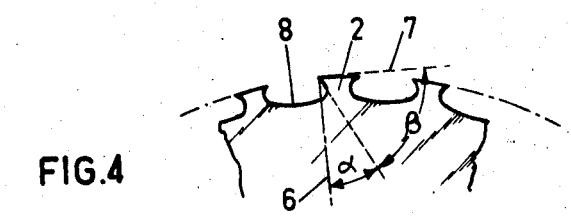
FIG. 4 is still an alternate form of blade.

From the standpoint of manufacture two favorable embodiments are shown in FIGS. 3 and 4. The cutting edges of the in pairs united teeth are arc shaped: in FIG. 4 the distance between two adjacent teeth of different pairs is longer than that in FIG. 3.

It may be self-evident that the direction of the cutting edge in these FIGS. is represented by the tangent to the circular cutting edge going through the point of the tooth.

It is to be understood that the form of this invention herein shown and described is to be taken as a preferred example of the same and that various modifications may be made within the scope of the present invention.

I claim:

1. A cutting blade for a rotary mower comprising thin flat sheet steel having a thickness from about 0.2 to 1.5 mm. and defining at least an arcuate portion of a ring, means adjacent the inner periphery of said arcuate portion for attaching said blade to a mowing disc of a rotary mower, said blade including a plurality of circumferentially extending teeth on the outer periphery thereof, each of said teeth being unitary with a symmetrical tooth so as to form a common projection on the ring portion, each of said teeth including an active cutting edge and an inactive edge meeting at a point, the active cutting edge of each tooth receding from its point, in relation to the direction of rotation of the blade, with respect to a radius passing through said point and the center of the arcuate portion, the inactive edge of each tooth adjacent the associated point being approximately perpendicular to a radius passing through said point, the inactive edge of each tooth defining an arc passing through the point of each tooth and having the same center as said arcuate portion.

2. A cutting blade as defined in claim 1 wherein the cutting edge of each tooth is defined by an arc lying in the plane of the blade.